United States Patent [19]

Lea et al.

[11] 3,893,065

[45] July 1, 1975

[54] HYDROPHONE ARRAY

[75] Inventors: John D. Lea, Huntington; George Rand, Franklin Square, both of N.Y.

[73] Assignee: Sperry Rand Corporation, New York, N.Y.

[22] Filed: Dec. 5, 1973

[21] Appl. No.: 422,125

[52] U.S. Cl............ 340/8 MM; 340/7 R; 340/8 FT; 340/3 T; 174/110 F
[51] Int. Cl......................... G01v 1/38; H04b 13/02
[58] Field of Search .......... 340/7 R, 3 T, 4 A, 8 FT, 340/8 S; 174/101.5, 110 F

[56] References Cited
UNITED STATES PATENTS

| | | | |
|---|---|---|---|
| 3,434,104 | 3/1969 | Stapleton et al. | 340/7 R |
| 3,531,760 | 9/1970 | Whitfill, Jr. | 340/7 R |

FOREIGN PATENTS OR APPLICATIONS

| | | | |
|---|---|---|---|
| 1,280,846 | 12/1960 | France | 340/7 R |

OTHER PUBLICATIONS

Bedenbender, "Electroacoustic Characteristics of Marine Seismic Streamers," 12/70, pp. 1054-1072, Geophysics, Vol. 35, No. 6 QE-500-G4.

*Primary Examiner*—Richard A. Farley
*Assistant Examiner*—N. Moskowitz
*Attorney, Agent, or Firm*—Howard P. Terry; Joseph M. Roehl

[57] ABSTRACT

An elongated hydrophone array of the type adapted to be towed behind a marine vessel includes a flexible tubular casing in which a chain of acoustic sensors is mounted. A drogue attached to the trailing end of the array serves to maintain the array in a streamer-like horizontal attitude during normal use. An acoustically transparent sheath of open-pore polyurethane foam surrounds the portion of the array in which the sensors are mounted so as to maintain the noise-producing turbulent boundary layer of water that occurs at the array-water interface at a considerable distance from the actual sensors.

8 Claims, 3 Drawing Figures

HYDROPHONE ARRAY

BACKGROUND OF THE INVENTION

1. Field of the Invention

This invention relates to hydrophones and more specifically to elongated towable hydrophone arrays.

2. Description of the Prior Art

Towed hydrophone arrays are well known in the art. Such arrays are used, for instance, in detecting underwater signals produced by vessels and in seismic explorations wherein a survey vessel tows the array through a body of water. The towing vessel includes means for generating bursts of acoustic energy which are reflected from the geological strata beneath the water and detected by the sensors in the hydrophone array. Since the array may be towed at a considerable distance behind the survey vessel, the sensors may be thus isolated from engine noise and the like generated by the vessel itself.

Towed arrays, however, are subject to another source of noise which has proven troublesome in prior art devices. The motion of the array through the water creates a turbulent boundary layer surrounding the array. This turbulent boundary layer creates pressure fluctuations which actuate the sensors so as to give rise to "flow noise" which may obscure the desired signal and prevent the acquisition of important data.

The problem of flow noise has been attacked in prior art devices by using larger diameter arrays so as to separate axially-mounted sensor elements from the turbulent boundary layer. Such large diameter arrays, however, become unwieldy and difficult to stow. Frequently, the arrays are stowed aboard the survey vessel where space is at a premium so that large diameter arrays become impractical.

SUMMARY OF THE INVENTION

Low-noise, easily stowable hydrophone arrays may be realized according to the principles of the present invention by employing a small diameter array and enclosing the sensor portion of the array in a sheath of acoustically transparent, open-pore, foam material of large diameter which serves to separate the sensors from a turbulent boundary layer during use, yet may be compressed to a small volume during non-use so as to minimize stowage space.

DESCRIPTION OF THE PREFERRED EMBODIMENT

Figure 1:
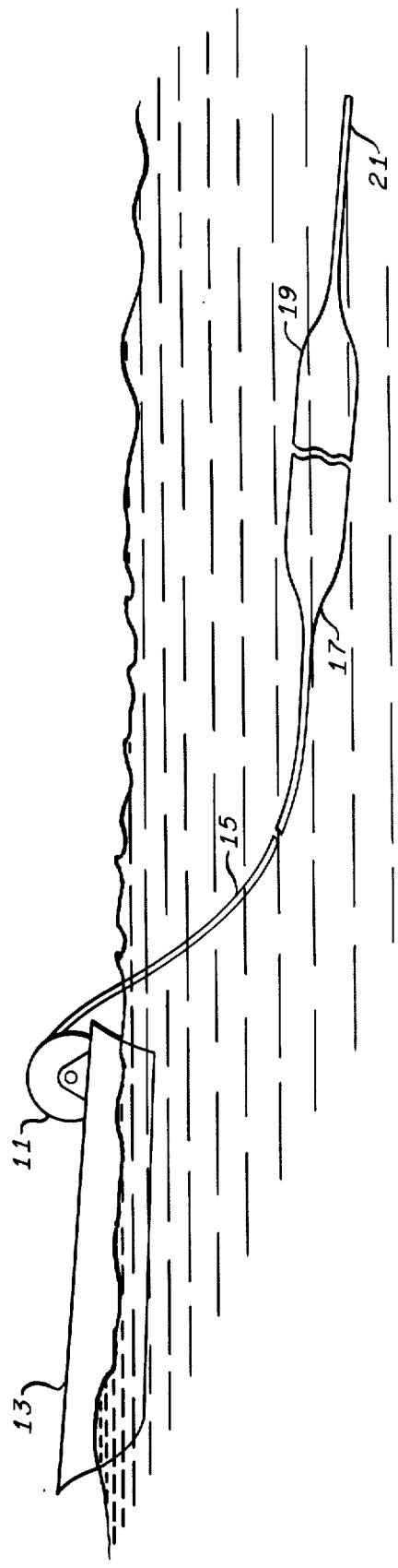
FIG. 1 is a sketch illustrating the manner in which a hydrophone array may be towed behind a survey vessel.

Referring now to FIG. 1, a typical towing configuration may include a towing hoist or other array handling equipment 11 mounted on the towing vessel 13. An array towing cable 15 may be coupled to the towing equipment at a convenient point. The towing cable typically includes a high strength core element sufficiently strong to withstand the drag produced by the array under tow, and electrical connectors suitable for coupling signals developed by the sensors in the hydrophone elements to measuring instruments in the towing vessel. A typical towing cable may have an outside diameter in the order of 0.5 inch and a length of 3000 feet although cables of a much greater length are often employed.

The array itself consists of a core member 17 containing the actual sensor elements and a foam sheath 19 surrounding the core and thus the sensor elements. Typically, a core member may have a diameter in the order of 1 inch and an overall length of several hundred feet whereas the foam sheath may have an outside diameter of 3 inches or greater and a comparable length. A drogue member 21 may be attached to the trailing end of the hydrophone array in order to stabilize the system in a substantially horizontal attitude. Typically, drogue members may be fashioned from ¾ inch polypropylene rope having a length in the order of 50 feet.

Figure 2:
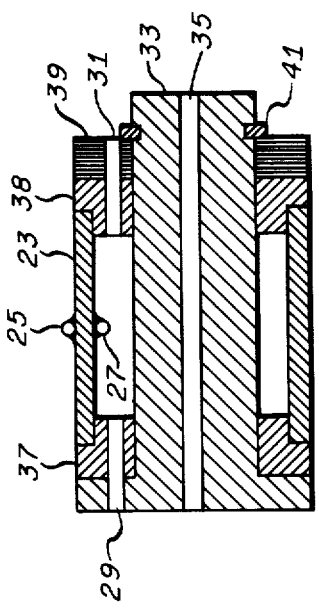
FIG. 2 is a cross-sectional view of a typical hydrophone element.

A typical hydrophone sensing element is illustrated in cross-section in FIG. 2. An acoustically responsive piezoceramic sensing element 23 is constructed in the form of a cylindrical sleeve. Although a wide variety of piezoceramic materials are available, commercially available lead-zerconate-titanate compositions are presently preferred since they combine high acoustic sensitivity, high time stability and high dielectric constant. Typically, electrodes may be applied to the outer and inner circumferences of the sensor elements and electrical connections attached to terminal points 25 and 27. Longitudinal ports 29 and 31 provide for the passage of connecting lead wires to the connection point 27. A convenient mounting means for the sensor element includes a bobbin member 33 having an axial bore 35 through which a central strain member may be threaded. The piezoceramic element 23 is vibration isolation mounted in the assembly by means of a rubber support elemeent 37 and 38, and secured by a washer 39 and snap ring 41.

Typically, the piezoceramic element 23 may have a length and an outside diameter of 0.75 inches, and a thickness of 0.062 inches.

It will be appreciated that the hydrophone element pictured in FIG. 2 is merely illustrative and that other types of elements may be used in practicing the invention if desired.

Figure 3:
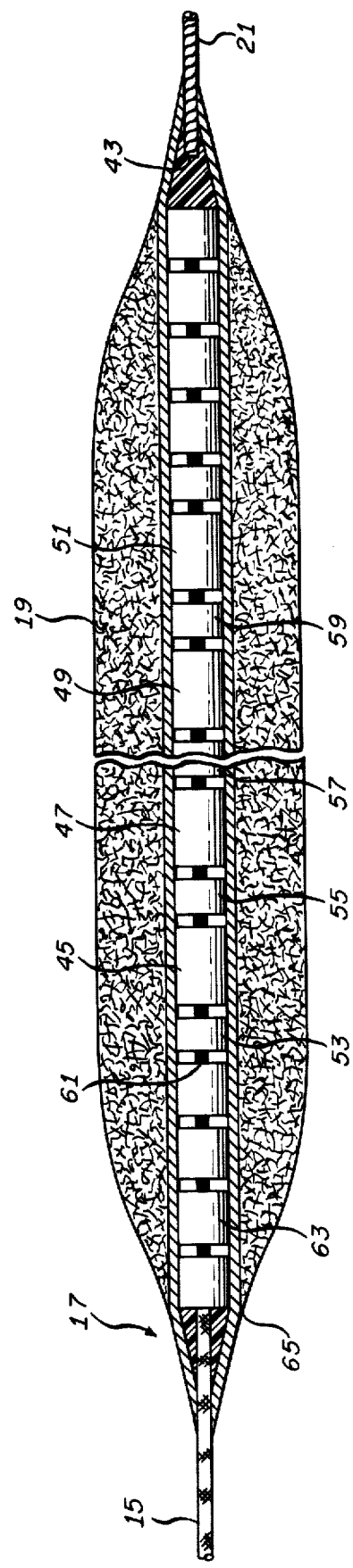
FIG. 3 is a sketch illustrating the construction of a hydrophone array useful in practicing the invention.

The construction of the overall array may be visualized by referring to FIG. 3. Mechanical towing stresses are applied to the array from the towing cable 15 through its axial strength member which is coupled to a strength member that passes through each element in the core member 17 and terminates at the forward end of the drogue 21 where it is mechanically secured at point 43. The core member 17 may be composed of individual sections, each 50 feet in length or longer, coupled together at their ends and carrying both strength and electrical feed-thru leads.

A typical array contains a plurality of hydrophone elements 45, 47, 49 and 51 together with suitable preamplifier elements 53, 55, 57 and 59. The foam sheath 19 surrounds the portion of the array containing the hydrophones and the associated preamplifiers, and may be extended or faired down to terminate at the towing cable 15 at one end and the drogue 21 at the other extremity of the array.

Rubber spacers such as the spacer 61 surround the axial strength member extending from the towing cable and permit a certain amount of flexure to occur in the array.

The portions of the central core member 17 extending under the faired ends of the foam sheath 19 include spacer elements such as the element 63 to provide the necessary buoyancy to the array. These spacer elements typically may be fabricated from commercially available glass microbubbles in a suitable binder material. The spacers are constructed generally in a cylindrical form but preferably contain longitudinal grooves to accommodate the lead wires from the sensor elements. The spacer elements typically have an outside diameter of 0.75 inches and a length of 2.75 inches and are separated by rubber spacers so as to provide the necessary flexure.

The entire central core member is enclosed in a tubular casing 65. In order to achieve the goals of the invention, the tubular casing must meet several stringent requirements. In order to permit the array to be reeled on a drum aboard the towing vessel, the tubular casing must have adequate flexibility and a relatively small diameter. In many installations, the array is passed through a constricting device as it is hauled aboard the towing vessel. This requires that the tubular casing be harder than similar casings used for oil-filled arrays in many prior art devices. These requirements can be met by rubber-molding the entire array. By using a proper hardness rubber for the tubular casing (e.g. approximately 50 durometers on the Shore A scale), the array can be passed safely through a constricting device but still have sufficient flexibility to be reeled on a drum. Such a structure meets the aforementioned requirements and also eliminates one source of noise experienced in prior art oil-filled lines which arises from the rubbing of the outer hose of such lines on the internal hydrophones. Furthermore, such a tubular casing may be fabricated with sufficiently thin walls so that with state of the art hydrophone and preamplifier elements, the outside diameter of the casing may be held to values in the order of 1 inch and yet provide the necessary protection for the enclosed elements.

Alternatively, the casing 65 may be fabricated from a rubber substitute, such as urethane or other elastomer, molded around the entire array. Commercially available urethane having a durometer (hardness) of 55 to 90 on the Shore A scale, has been used for this purpose. Such material has been found to provide a satisfactory compromise between flexibility necessary to reel the array on a drum and stiffness needed for hydrodynamic stability and resistance to the action of the constricting device.

The tubular casing 65 is faired into the smaller diameter towing cable 15 and drogue lines 21 so as to provide a smooth transition between these elements and the larger diameter casing.

The foam sheath 19 has a sufficiently large diameter (typically on the order of 3 inches or larger) so that the turbulent boundary layer of water surrounding the array during normal operation is physically separated from the actual sensor element. This spacing reduces the noise resulting from the pressure fluctuations in the turbulent layer to an insignificant level in the sensor elements.

In order to present minimum disturbance of the desired received acoustics signals, the sheath 19 must be fabricated from a material which is acoustically transparent. In order to meet the aforementioned stowage requirements, the sheath 19 must be constructed from a highly compressible material.

These requirements can be met by fabricating the sheath from a commercially available reticulated (open-pore) polyurethane foam. Such material is characterized by a three-dimensional skeletal structure of strands which provide 97 percent of void space and a high degree of permeability. Such a material, for instance, is sold by the Foam Division of the Scott Paper Company in Chester, Pennsylvania, as "Scott Industrial Foam", and is available in a variety of porosities. Tests have proven that such materials having porosities between 10 pores per inch and 100 pores per inch are acoustically transparent over the frequency ranges of interest when water fills the void space.

Since the foam material is composed mostly of void, the foam is highly compressible and regains its original shape after long periods under compression.

Stowage of an array employing such a foam sheath may be accomplished in one of two ways, depending upon the particular application.

In some instances, it may be preferred to reel the entire assembly aboard the towing vessel. Since the foam is highly compressible, it adds very little bulk to the stowed assembly. The great resilience of the foam material assures that the sheath will resume its original shape when the array is subsequently extended for measurement purposes.

Alternatively, the foam sheath may be friction mounted so that it may be actually stripped from the array by a suitable device when the array is hauled aboard the towing vessel. In such instances, the sheath will be longitudinally compressed so that it will present a small bulk for stowage purposes. When measurements are to be resumed, the array may again be passed through the foam sheath so that the sheath can again expand into an operative position surrounding the hydrophone elements.

Although the array of the present invention will ordinarily be used in applications in which the array is towed through the water, it will be appreciated that the array may also be used in moored applications wherein the water currents themselves will serve to deploy the anchored array into an operative position.

While the invention has been explained in its preferred embodiment, it will be understood that the words which have been used are words of description rather than limitation and that changes within the purview of the appended claims may be made without departing from the true scope and spirit of the invention in its broader aspects.

What is claimed is:

1. An improved towable hydrophone array of the type employing acoustic sensor means enclosed in an elongated tubular casing and adapted to respond to incident acoustic signals arriving from various directions with respect to the longitudinal axis of said casing, said improvement comprising sheath means positionable around the portion of the array containing said sensor means, said sheath means being fabricated from a highly compressible, reticulated material having open pores arranged to permit water to fill the voids therein during normal operation whereby the sheath means is rendered substantially acoustically transparent in the frequency range of interest, said sheath means having an outside diameter which is large with respect to the outside diameter of said tubular casing.

2. The improved hydrophone array of claim 1 wherein the sensor means includes a plurality of sensor elements arranged in a chain-like series concentric with the axis of said tubular casing, and the sheath means is formed as an elongated tubular member extending longitudinally beyond both ends of said chain-like series, said sheath means further having an outside diameter which is approximately at least three times as great as the outside diameter of said tubular casing.

3. The improved hydrophone array of claim 2 wherein the tubular casing is fabricated from molded rubber having a hardness of approximately 50 durometer on the Shore A scale.

4. The improved hydrophone array of claim 2 wherein the tubular casing is fabricated from a urethane substitute rubber compound having a hardness of approximately 55 to 90 durometer on the Shore A scale.

5. The improved hydrophone array of claim 2 wherein the sheath means is fabricated from an open-pore polyurethane foam material having a three-dimensional skeletal structure of stranded material.

6. The improved hydrophone array of claim 5 wherein the foam material has a porosity between about 10 and 100 pores per inch.

7. The improved hydrophone array of claim 6 wherein the sheath is permanently secured to the outside diameter of the tubular casing.

8. The improved hydrophone array of claim 7 wherein the sheath is friction mounted on said tubular casing.

* * * * *